: US 7,905,721 B2
: Mar. 15, 2011

(12) United States Patent
Niewels et al.

(54) AIR SOURCE DEVICE AND A METHOD FOR USE IN A MOLDING SYSTEM

(75) Inventors: Joachim Johannes Niewels, Thornton (CA); Robert Bruce Weber, Brampton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 386 days.

(21) Appl. No.: 11/758,033

(22) Filed: Jun. 5, 2007

(65) Prior Publication Data

US 2008/0305204 A1 Dec. 11, 2008

(51) Int. Cl.
*B29C 45/72* (2006.01)
(52) U.S. Cl. ........ 425/548; 425/445; 425/446; 425/526; 425/547; 425/572; 264/237; 264/328.14; 264/348
(58) Field of Classification Search ................. 425/445, 425/446, 526, 534, 547, 548, 552, 572; 264/348, 264/328.14, 328.16, 237
See application file for complete search history.

(56) References Cited

U.S. PATENT DOCUMENTS

| | | | |
|---|---|---|---|
| 3,709,644 A * | 1/1973 | Farrell | 425/160 |
| 3,789,093 A * | 1/1974 | Bose | 264/37.16 |
| 3,930,779 A | 1/1976 | Farrell | |
| 3,937,609 A | 2/1976 | Ryder | |
| 4,087,227 A * | 5/1978 | Uhlig | 425/526 |
| 4,091,059 A | 5/1978 | Ryder | |
| 4,209,290 A * | 6/1980 | Rees et al. | 425/547 |
| 4,230,470 A | 10/1980 | Matsuda et al. | |
| 4,364,893 A | 12/1982 | Waters | |
| 4,473,515 A * | 9/1984 | Ryder | 264/28 |
| 4,666,394 A * | 5/1987 | Wakamiya et al. | 425/342.1 |
| 4,803,787 A | 2/1989 | Amann | |
| 4,976,900 A | 12/1990 | Tsutsumi | |
| 5,232,715 A * | 8/1993 | Fukai | 425/526 |
| 5,402,938 A * | 4/1995 | Sweeney | 239/431 |
| 5,514,309 A * | 5/1996 | Williamson et al. | 264/37.17 |
| 5,585,063 A * | 12/1996 | Slater et al. | 264/348 |
| 5,620,715 A * | 4/1997 | Hart et al. | 425/143 |
| 5,653,934 A * | 8/1997 | Brun et al. | 264/334 |
| 5,714,109 A | 2/1998 | Diller | |
| 5,750,162 A * | 5/1998 | Schad et al. | 425/533 |
| 5,772,951 A * | 6/1998 | Coxhead et al. | 264/537 |
| 5,837,299 A * | 11/1998 | Bright et al. | 425/526 |
| 5,858,414 A | 1/1999 | Hayashi et al. | |

(Continued)

FOREIGN PATENT DOCUMENTS

EP 0122885 B1 11/1989

(Continued)

*Primary Examiner* — Joseph S Del Sole
*Assistant Examiner* — Seyed Masoud Malekzadeh
(74) *Attorney, Agent, or Firm* — Husky Intellectual Property Services

(57) ABSTRACT

According to embodiments of the present invention, there is provided an air dehumidifying sub-system and a method for use in a molding system. For example, the air source device for use with a post-mold treatment device for treating a molded article, the air source device comprising: an air inlet and a refrigerating unit operatively coupled to the air inlet, the refrigerating unit and the air inlet arranged such that air is forced between the air inlet and the refrigerating unit for cooling the air; an air outlet coupled to the refrigerating unit for connecting the refrigerating unit to an air management device of the post-mold treatment device, the air management device configured to direct, in use, cooled air onto a portion of the molded article being treated.

12 Claims, 3 Drawing Sheets

U.S. PATENT DOCUMENTS

| | | | |
|---|---|---|---|
| 6,042,944 A | 3/2000 | Pitowski | |
| 6,139,789 A * | 10/2000 | Neter et al. | 264/535 |
| 6,143,225 A * | 11/2000 | Domodossola et al. | 264/237 |
| 6,168,416 B1 * | 1/2001 | Galt | 425/556 |
| 6,223,541 B1 * | 5/2001 | Farrag | 62/62 |
| 6,296,473 B1 * | 10/2001 | Ohlmann | 425/547 |
| 6,299,431 B1 * | 10/2001 | Neter | 425/526 |
| 6,299,504 B1 * | 10/2001 | Gluckin | 450/41 |
| 6,461,556 B1 * | 10/2002 | Neter | 264/237 |
| 6,488,878 B1 * | 12/2002 | Neter et al. | 264/237 |
| 6,767,197 B2 * | 7/2004 | Boyd et al. | 425/143 |
| 6,802,705 B2 * | 10/2004 | Brand et al. | 425/547 |
| 6,878,316 B1 * | 4/2005 | Cochran et al. | 264/40.1 |
| 6,887,418 B2 * | 5/2005 | Olaru et al. | 264/328.1 |
| 6,951,452 B2 * | 10/2005 | Unterlander et al. | 425/145 |
| 7,052,270 B2 * | 5/2006 | Unterlander et al. | 425/547 |
| 7,056,465 B2 * | 6/2006 | Unterlander et al. | 264/348 |
| 7,162,942 B2 | 1/2007 | Dippold | |
| 7,421,310 B2 * | 9/2008 | Niewels | 700/205 |
| 2006/0006578 A1 | 1/2006 | Johnson et al. | |

FOREIGN PATENT DOCUMENTS

| | | |
|---|---|---|
| GB | 2064099 | 6/1981 |
| GB | 2064099 A | 6/1981 |
| JP | 200202895 A | 7/2000 |
| WO | 0249820 A2 | 6/2002 |
| WO | 03097327 A1 | 11/2003 |

* cited by examiner

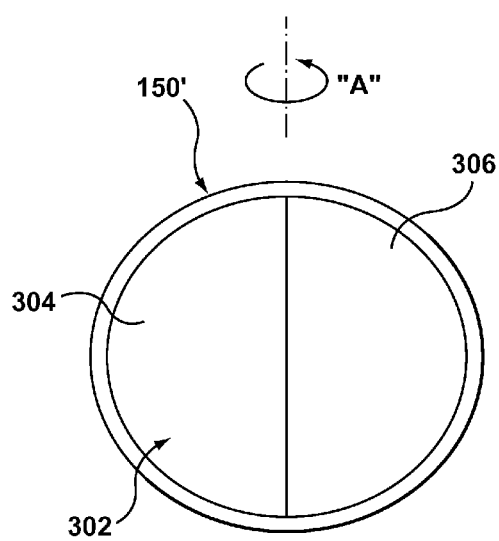
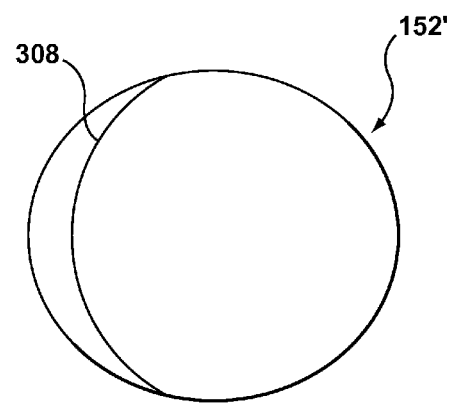
FIG. 3A  FIG. 3B

AIR SOURCE DEVICE AND A METHOD FOR USE IN A MOLDING SYSTEM

FIELD OF THE INVENTION

The present invention generally relates to, but is not limited to, molding systems, and more specifically the present invention relates to, but is not limited to, an air source device and a method for use in a molding system.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethelene terephalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

Depending on a type of the finished molded article, the quality is more or less critical. However, it can be generally said that quality of the finished molded article is paramount for a number of reasons. With some applications, the quality is more an issue of aesthetics and customer appeal, with other applications, quality is essential for proper functioning of the molded article and/or subsequent handling thereof (such as, for example, blow molding of a preform into a beverage container). Quality of the finished molded articles depends on many parameters, one of which includes content of moisture in the ambient air in substantially close proximity of a molding machine. Presence of the ambient moisture within the molding machine can lead to a number of operational problems and quality defects. Examples of such operational problems and quality defects include, but are not limited to, problems associated with transferring molded articles out of cooling receptacles (ex. cooling tubes), marks on the molded articles, etc. This problem is particularly exacerbated when the molding machine is operated in a location with a relatively high humidity levels.

It has been known to use a dehumidifier to remove dewing from the molding system. An example of such an arrangement is disclosed in a Japanese patent application bearing a publication number 2000202895A (Inventors: Nishizawa Toshio, Ogiwara Shuichi; Publication date: Jul. 25, 2000). This patent application teaches an air conditioner 62 of an injection stretch blow molding machine. The injection stretch blow molding machine has an injection molding station, where a molten synthetic resin into is injected into a cooled mold to mold to form a preform. There is also provided a blow molding station 16, where the injection-molded preform is heated to a proper blow molding temperature to subject the same to stretch blow molding. The respective molding work space atmospheres of the injection molding station 14 and the blow molding station 16 are isolated by an isolating sheet 64 and the isolated injection molding station is dehumidified by a dehumidifier 66.

U.S. Pat. No. 4,976,900 issued to Tsutsumi on Dec. 11, 1990 discloses a method and an apparatus for injecting a steam into a mold in an injection molding machine by injecting a desired stream toward the opening of the metal mold including a gate and cavities in connection with the opening and closing operation of the metal mold thereby intending the cooling solidification of the molten resin on the gate portion and simultaneously intending removal of dewing and an oily matter on the surface of the metal mold.

U.S. Pat. No. 7,168,942 issued to Wieder on Jan. 30, 2007 discloses a method and apparatus for controlling the temperature of an injection mold by passing pressurized air contained in an air supply tube through an orifice into an exhaust channel, wherein the pressure of the air in the exhaust channel is lower than the pressure of the air in the air supply tube. As the pressurized air is released through the orifice, cooling is produced that can be applied to a portion of an injection mold where cooling is desired, in order to control the temperature of that portion of the injection mold.

European patent application bearing a publication number 0122885B1 (Inventors: Piazzola, Gaetano; Publication date: Nov. 15, 1989) discloses a system for extruding, drawing, vacuum molding or processing, or the like hot processing of plastomers or elastomers, which can conveniently utilize the hot air from the cooling process of its heated component parts. The system makes use, to heat the extruder cylinder, of ventilated electric thermal units 1 wherein ventilation is performed in closed circuit fashion. In particular, arrangements are made to convey the hot air from the cited electric thermal unit 1, through specially provided ducting 5, 6, 7, to areas of the system where application of heat is required.

U.S. Pat. No. 5,714,109 issued to Diller on Feb. 3, 1998 discloses a method and apparatus which allows blow-molded plastic containers to be manufactured at high rates of production independent of ambient environmental conditions. The method and apparatus eliminate the need to make adjustments to blow-molding oven operating parameters when environmental conditions change and reduce defects such as caused by water spots. The method includes the steps of flowing ambient air over cooling coils to remove moisture, heating the air to a constant pre-determined temperature and delivering the conditioned air to the blow-molding oven. The apparatus includes a variable speed blower which forces ambient air at a predetermined volumetric flow rate over cooling coils and an electric heater to provide the blow molding oven with a constant volumetric flow rate of constant temperature and low humidity air.

British patent 2 064 099 (Inventor: Stuart Lawson; Publication date: Jun. 10, 1981) discloses a conventional refrigeration-type dehumidifier that has an air cooler such as an evaporator for cooling the air in order to condense the required amount of moisture, followed by a heater to heat the airstream to the required temperature. An air-to-air heat exchange system is provided which transfers hear from the airstream before the air cooler to the stream after the air cooler.

SUMMARY OF THE INVENTION

According to a first broad aspect of the present invention, there is provided an air source device for use with a post-mold treatment device for treating a molded article. The air source device comprises an air inlet and a refrigerating unit operatively coupled to the air inlet, the refrigerating unit and the air inlet arranged such that air is forced between the air inlet and the refrigerating unit for cooling the air; an air outlet coupled to the refrigerating unit for connecting the refrigerating unit to an air management device of the post-mold treatment device, the air management device configured to direct, in use, cooled air onto a portion of the molded article being treated.

According to a second broad aspect of the present invention, there is provided an air management system for use with a molding system. The air management system comprises an air management device operatively coupled to a post-mold treatment device of the molding system, the post-mold treatment device for treating a molded article positioned in a molded article receptacle of the robot of the molding system; an air source device configured to output cooled air; a linking structure operatively coupling the air management device to the air source device; the post-mold treatment device comprising a plurality of treatment pins configured to direct, in use, cooled air from the air management device onto a portion of the molded article being treated.

According to a third broad aspect of the present invention, there is provided a molding system. The molding system comprises means for forming a molded article; means for removing the molded article; means for post-mold treating the molded article; means for cooling air; means for coupling the means for post-mold treating to the means for cooling.

According to another broad aspect of the present invention, there is provided a linking structure operatively coupling an air management device of a molding system to an air source device of a molding system to supply cooled air between the air source device and the air management device.

According to yet another broad aspect of the present invention, there is provided an air source device for use with a post-mold treatment device for treating a molded article. The air source device comprises an air inlet and an air compressor coupled to the air inlet; a refrigerating unit coupled to the air compressor, the air compressor configured to force air between the air inlet and the refrigerating unit for cooling the air; an air outlet coupled to the refrigerating unit for connecting the refrigerating unit to an air management device of the post-mold treatment device, the air management device configured to direct, in use, cooled air onto a portion of the molded article being treated.

A technical effect, amongst others, of the embodiments of the present invention may include improved molded article quality. Another technical effect of embodiments of the present invention may include reduced time cycle. It should be expressly understood that not all of the technical effects, in their entirety, need be realized in each and every embodiment of the present invention.

DESCRIPTION OF THE DRAWINGS

A better understanding of the embodiments of the present invention (including alternatives and/or variations thereof) may be obtained with reference to the detailed description of the exemplary embodiments along with the following drawings, in which:

FIGS. 3A and 3B depict front views of a first linking arrangement 150' and a second linking arrangement 152' of the air dehumidifying sub-system of FIG. 1, respectively, according to another non-limiting embodiment of the present invention.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
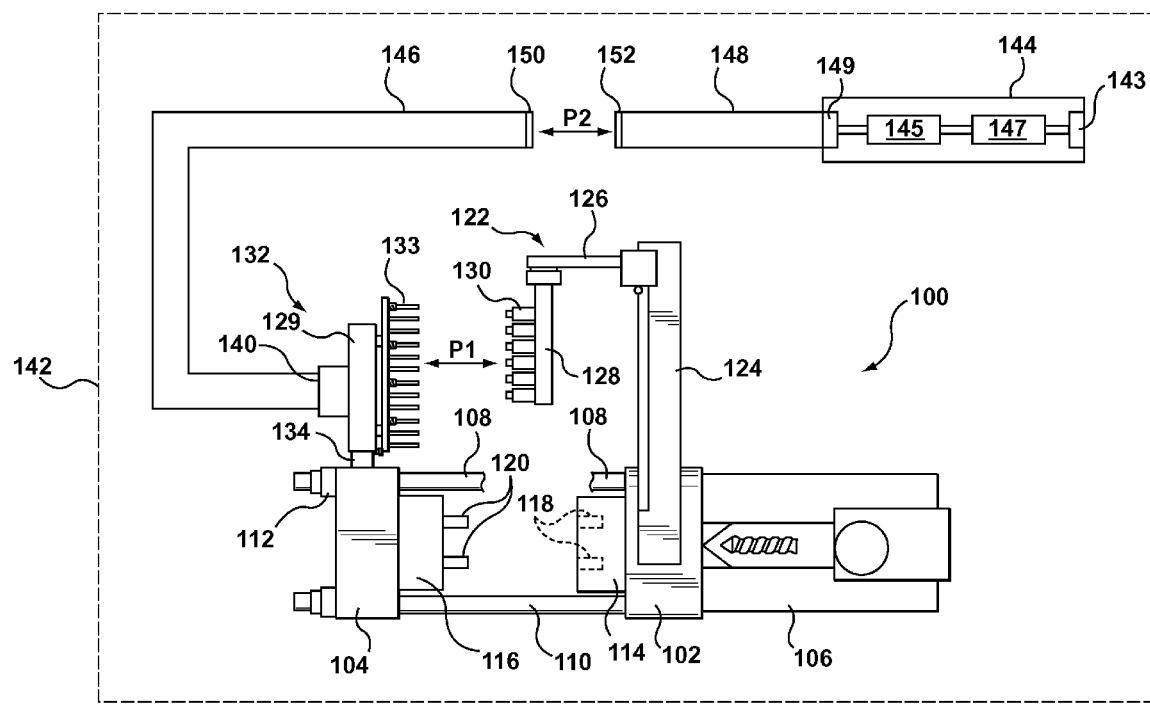
FIG. 1 is a schematic representation of a molding system 100 according to a non-limiting embodiment of the present invention including an air dehumidifying sub-system.

With reference to FIG. 1, there is depicted a non-limiting embodiment of a molding system 100 which can be adapted to implement embodiments of the present invention. For illustration purposes only, it shall be assumed that the molding system 100 comprises an injection molding system for processing molding material, such as, PET for example. However, it should be understood that in alternative non-limiting embodiments, the molding system 100 may comprise other types of molding systems, such as, but not limited to, compression molding systems, metal molding systems and the like. It should be further understood that embodiments of the present invention are applicable to the molding system 100 incorporating any multicavitation mold, including PET molds, thinwall articles molds, closures molds and the like.

Within the non-limiting embodiment of FIG. 1, the molding system 100 comprises a fixed platen 102 and a movable platen 104. The molding system 100 further comprises an injection unit 106 for plasticizing and injection of molding material. In operation, the movable platen 104 is moved towards and away from the fixed platen 102 by means of stroke cylinders (not shown) or any other suitable means. Clamp force (also referred to as closure or mold closure tonnage) can be developed within the molding system 100, for example, by using tie bars 108, 110 and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a toggle-clamp arrangement (not depicted) or the like.

A first mold half 114 can be associated with the fixed platen 102 and a second mold half 116 can be associated with the movable platen 104. In the specific non-limiting embodiment of FIG. 1, the first mold half 114 comprises one or more mold cavities 118. As will be appreciated by those of skill in the art, the one or more mold cavities 118 may be formed by using suitable mold inserts or any other suitable means. As such, the first mold half 114 can be generally thought of as a "mold cavity half". The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half".

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present invention, the position of the first mold half 114 and the second mold half 116 can be reversed and, as such, the first mold half 114 can be associated with the movable platen 104 and the second mold half 116 can be associated with the fixed platen 102.

In an alternative non-limiting embodiments of the present invention, the fixed platen 102 need not be stationary and may as well be moved in relation to other components of the molding system 100.

FIG. 1 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art. It should be appreciated that one of the first mold half 114 and the second mold half 116 can be associated with a number of additional mold elements, such as for example, one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The molding system 100 can further comprise a robot 122 operatively coupled to the fixed platen 102. Those skilled in the art will readily appreciate how the robot 122 can be operatively coupled to the fixed platen 102 and, as such, it will not be described here in any detail. The robot 122 comprises a mounting structure 124, an actuating arm 126 coupled to the mounting structure 124 and a take-off plate 128 coupled to the actuating arm 126. The take-off plate 128 comprises a plurality of molded article receptacles 130. Generally speaking, the purpose of the plurality of molded article receptacles 130 is to remove molded articles from the one or more mold cores 120 (or the one or more mold cavities 118) and/or to implement post mold cooling of the molded articles. In the specific non-limiting example being illustrated herein, the plurality of molded article receptacles 130 comprises a plurality of cooling tubes for receiving a plurality of molded preforms. However, it should be expressly understood that the plurality of molded article receptacles 130 may have other configurations. The exact number of the plurality of molded article receptacles 130 is not particularly limited.

Schematically depicted in FIG. 1 is the robot 122 of a side-entry type. However, it should be understood that in alternative non-limiting embodiments of the present invention the robot 122 can be of a top-entry type. It should also be expressly understood that the term "robot" is meant to encompass structures that perform a single operation, as well as structures that perform multiple operations.

The molding system 100 further comprises a post-mold treatment device 132 operatively coupled to the movable platen 104. Those skilled in the art will readily appreciate how the post-mold treatment device 132 can be operatively coupled to the movable platen 104 and, as such, it will not be described here in any detail. The post-mold treatment device 132 comprises a mounting structure 134 used for coupling the post-mold treatment device 132 to the movable platen 104. The post-mold treatment device 132 further comprises a plenum 129 coupled to the mounting structure 134. Coupled to the plenum 129 is a plurality of treatment pins 133. The number of instances of the plurality of treatment pins 133 generally corresponds to the number of instances of the plurality of molded article receptacles 130.

Generally speaking, the purpose of the plenum 129 is to supply services (such as, for example, vacuum and/or air stream) to the plurality of treatment pins 133. The plenum 129 comprises an air management device 140, such as for example, an air compressor and the like.

The molding system 100 further comprises an enclosure screen, schematically depicted in FIG. 1 at 142. Within the specific non-limiting embodiment depicted in FIG. 1, the enclosure screen 142 is depicted encompassing all the components of the molding system 100. However, it should be understood that in practice, the enclosure screen 142 may encompass only some or all of the components of the molding system 100. For example, it is possible for the injection unit 106 to be outside of the enclosure screen 142. It is also possible for some other components, such as a portion of the robot 122 and/or the post-mold treatment device 132 (or portions thereof) to be outside the enclosure screen 142. It is also possible for the enclosure screen 142 to not completely encompass the molding system 100 in the sense that it may have openings, for example, an opening for a conveyor belt for removal of molded articles dislodged from the plurality of treatment pins 133. Persons skilled in the art will appreciate that there yet further alternatives possible for implementing the enclosure screen 142.

Generally speaking, the purpose of the enclosure screen 142 is to provide a micro-climate around the molding system 100 (or a portion thereof) or, in other words, to separate an air in substantially close proximity to the molding system 100 from the rest of ambient air (such as, for example, the air within a dwelling where the molding system 100 is located). In some embodiments of the present invention, the enclosure screen 142 can be implemented as a multi-purpose enclosure screen 142, which performs multiple functions. Some of the functions, which may be shared by the enclosure screen 142, include some or all of: (a) protecting operators operating the molding system 100 from moving parts, (b) preventing spills of the melt, (c) preventing harmful gases from escaping into the ambient environment, (d) preventing dehumidified air expelled into an area defined within the enclosure screen 142 and the ambient air from mixing, etc. In other non-limiting embodiments of the present invention, the enclosure screen 142 may be implemented as a dedicated element (sometimes referred to by those of skill in the art as a "dehumidification curtain") that exclusively perform the function of preventing dehumidified air and the ambient air from mixing.

In some of these embodiments of the present invention, the enclosure screen 142 is made of aluminum and plastic glass. However, this need not be so in every embodiment of the present invention and those skilled in the art will appreciate other suitable materials that can be used, such as, for example, steel, fiber glass, plastics, glass, textiles, etc.

According to non-limiting embodiments of the present invention, there is also provided an air source device. The air source device may comprise a dehumidifier 144. In alternative non-limiting embodiments of the present invention, the air source device may comprise an air conditioner (not depicted). In yet further non-limiting embodiments of the present invention, the air source device may comprise any suitable cooling means suitable for cooling air to a target air temperature.

The air dehumidifying sub-system and the air management device 140 can be said to form part of an air management system. The location of dehumidifier 144 is not particularly limited and can be located in a suitable location around the molding system 100, within or outside the enclosure screen 142. In a specific non-limiting embodiment of the present invention, the dehumidifier 144 can be located underneath the injection unit 106. However, other alternatives are also possible, such as, for example, a side-by-side arrangement and the like. In some embodiments of the present invention, the dehumidifier 144 can be located within the enclosure screen 412. In alternative embodiments (not depicted), the dehumidifier 144 or a portion thereof can be located outside of the enclosure screen 142. The dehumidifier 144 can comprise a conventional dehumidifier but for the specific differences presented herein below.

In the specific non-limiting embodiment of the present invention, the dehumidifier 144 comprises an air inlet 143, a refrigerating unit 145 and an air outlet 149. The air inlet 143, the air compressor 147, the refrigerating unit 145 and the air outlet 149 are operatively coupled therebetween by means of air ducts (not separately numbered) or by any other suitable means. The purpose of the refrigerating unit 145 is to receive air; cool the air to a target air temperature. In some embodiments of the present invention, the target air temperature is selected so that when the so-cooled air is expelled around the molding system 100, it causes the air around the molding system 100 to have a dew point that either substantially equals to or is below of a temperature associated with coolant media used for in-mold cooling. In other embodiments of the present invention, the target air temperature may also be selected so that the moisture from the so-cooled air can condense and be removed). Accordingly, in some embodiments of the present invention, the refrigerating unit 145 can cool air to a temperature sufficient to separate moisture from the so-cooled air. In other embodiments of the present invention, the air supplied to the refrigerating unit 145 via the air inlet 143 may be dried air.

For simplicity, the description to be presented herein below will use an example of the air source device comprising the dehumidifier 144. In some embodiments of the present invention, the dehumidifier 144 further comprises an air compressor 147 coupled to the air inlet 143 and to the refrigerating unit 145, the air compressor 147 being configured to force air between the air inlet 143 and the refrigerating unit 145. To that extent, the air compressor 147 is configured to (i) draw air through the air inlet 143 and (ii) force the air towards the air outlet 149 via the refrigerating unit 145. The refrigerating unit 145 is configured to cool the passing air and to remove the moisture therefrom. To that extent, the refrigerating unit 145, may comprise a plurality of cooling coils (not depicted) or any other suitable cooling means. Even though not depicted in FIG. 1, the dehumidifier 144 further comprises means for discharging the so-removed moisture. In alternative embodiments of the present invention (not depicted), the air compressor 147 can be omitted and the air may be drawn by means of a downstream device, for example, the air management device 140.

It is worthwhile noting the dehumidifier 144 does not require a reheating unit or other means to route the so-cooled air around, for example, the heat exchanger of the refrigerating unit 145 jointly referred to as heating means) in order to re-heat the so-cooled air. This is not to say that the dehumidifier 144 is required to omit any heating means altogether. Accordingly, if such heating means are present, they are simply not used. For example, a by-pass can be created between the air outlet 149 and the refrigerating unit 145 to bypass a heating means conventionally disposed therebetween. Accordingly, it should be understood that in some embodiments of the present invention, the dehumidifier 144 may comprise conventional dehumidifier with the heating means being bypassed. Even though not depicted in FIG. 1, the dehumidifier 144 is coupled to a source of power (not depicted), which can be a plant-wide source of power shared with the molding system 100 or a dedicated source of power.

The air management device 140 is associated with a first linking structure 146 and dehumidifier 144 is associated with a second linking structure 148. The first linking structure 146 and the second linking structure 148 jointly form a linking structure between the dehumidifier 144 and the air management device 140.

In the specific embodiment being illustrated herein, the first linking structure 146 and the second linking structure 148 comprises a respective duct. In some embodiments of the present invention, the respective duct can be made from plastic, metal or any other suitable rigid or semi-rigid material. Some examples of the materials that can be used include, but are not limited to, steel, aluminum, fiberglass, plastics, etc. The first linking structure 146 is operatively coupled to the air management device 140. The second linking structure 148 is operatively coupled to the dehumidifier 144 and, more specifically, to the air outlet 149.

Within the embodiment illustrated in FIG. 1, the robot 122 and the post-mold treatment device are depicted in an open position and, as such, the robot 122 and the post-mold treatment device are separated by a first distance P1. This open position is generally associated with a portion of the molding cycle whereby the robot 122 removes molded articles from the molding cavities defined between one or more mold cores 120 and one or more mold cavities 118. As is shown in FIG. 1, within this open position, the first linking structure 146 and the second linking structure 148 are separated by a second distance P2. The second distance P2 generally corresponds to the first distance P1 in the sense that when the robot 122 and the post-mold treatment device 132 are in an operating position (i.e. in the mold closed position when the plurality of treatment pins 133 engages molded articles positioned within the plurality of molded article receptacles 130), the first linking structure 146 engages the second linking structure 148. In other words, the first linking structure 146 and the second linking structure 148 are forced into an operative engagement.

More specifically, the first linking structure 146 comprises a first linking arrangement 150 and the second linking structure 148 comprises a second linking arrangement 152. Generally speaking, in the above-mentioned operating position, the first linking arrangement 150 operatively engages the second linking arrangement 152 so that an air stream can pass between the dehumidifier 144 and the air management device 140 with no substantial air losses.

Figures 2A, 2B:
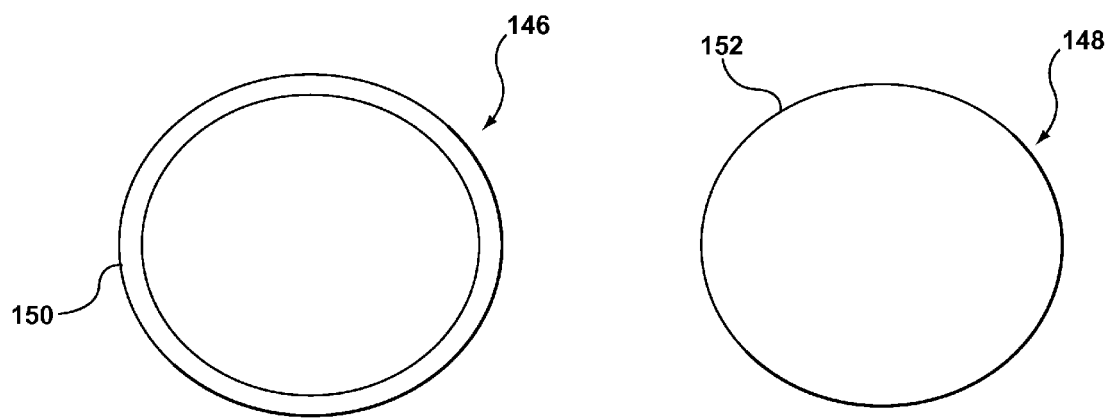
FIGS. 2A and 2B depict front views of a first linking arrangement 150 and a second linking arrangement 152 of the air dehumidifying sub-system of FIG. 1, respectively; according to a non-limiting embodiment of the present invention.
Figure 2C:
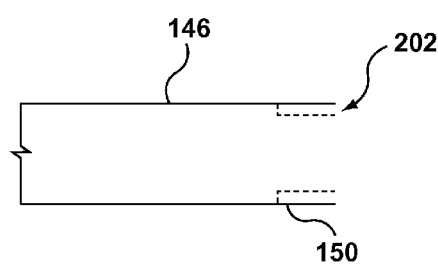
FIG. 2C depicts a side view of a first linking structure 146 of the air dehumidifying sub-system of FIG. 1, according to a non-limiting embodiment of the present invention.

A specific non-limiting embodiment of configuration of the first linking arrangement 150 and the second linking arrangement 152 are illustrated with reference to FIGS. 2A, 2B and 2C. FIGS. 2A and 2B depict the front views of the first linking arrangement 150 and the second linking arrangement 152, respectively. FIG. 2C depicts a side view of the first linking structure 146. More specifically, the first linking arrangement 150 comprises a tubular pocket 202 defined on an interior surface of the first linking structure 146. The second linking arrangement 152 is dimensioned so that, in the operating position, a portion thereof is received within the tubular pocket 202. Within these embodiments of the present invention, the tubular pocket 202 and the second linking arrangement 152 are dimensioned such that to prevent any substantial leakage of air and to rather route the air stream between the dehumidifier 144 and the air management device 140. Naturally, in an alternative non-limiting embodiment of the present invention, the configuration of the first linking arrangement 150 and the second linking arrangement 152 can be reversed or, in other words, the tubular pocket 202 can be defined on the second linking structure 148 rather than on the first linking structure 146.

Naturally, the molding system 100 may comprise a number of additional components, such as a hot runner (not depicted) associated, for example, with the fixed platen 102. It should be expressly understood that the molding system 100 may have other configurations and the description presented above has been provided as an example only and is not intended to be limiting in any form. In other non-limiting embodiments of the present invention, the molding system 100 can have other configurations with more or fewer components.

Operation of the dehumidifier 144 will now be explained in greater detail within the context of the molding system 100. Within some embodiments of the present invention, the dehumidifier 144 can be, when required, continuously switched on or, in other words, the air compressor 147 can be configured to continuously draw air through the air inlet 143 and pass it towards the air outlet 149 via the refrigerating unit 145. It should be recalled that in the above-mentioned open position, where the first linking structure 146 and the second linking structure 148 are separated by the second distance P2 and, as such, the first linking arrangement 150 is not operatively coupled to the second linking arrangement 152. This, in turn, means that the cooled air is expelled from the dehumidifier 144 via the air outlet 149 and the second linking structure 148 into a space defined within the enclosure screen 142. In alternative non-limiting embodiments of the present invention, the second linking structure 148 may comprise an auxiliary linking structure (not depicted). The auxiliary linking structure may be of any suitable configuration, such as, for example, "Y" shaped. In this example, a first leg of the "Y" shaped linking structure can be substantially similar to the second linking structure 148 of FIG. 1. A second leg of the "Y" shaped linking structure may be configured to direct cooled air to a desired portion of the molding system 100, such as, for example, one or more mold cores 120, one or more mold cavities 118 and the like.

On the other hand, during transition between the open position and the above-mentioned operating position, the first linking structure 146 moves together with the post-mold treatment device 132 (and the movable platen 104) towards the second linking structure 148. In the operating position, the first linking arrangement 150 operatively engages the second linking arrangement 152. This, in turn, means that the cooled air is expelled from the dehumidifier 144 via the air outlet 149, the second linking structure 148 and first linking structure 146 towards the air management device 140. The air management device 140 forces the cooled air via the plurality of treatment pins 133 towards molded articles being treated in the plurality of molded article receptacles 130. Naturally, the process of forcing the cooled air about the molded articles being treated transfers some of the heat from the molded articles to the forced air, effectively, heating the forced air and cooling down the molded articles being treated. The air is then expelled into space defined within the enclosure screen 142, where it mixes with cooled air expelled during the above-described open position.

A technical effect of these embodiments of the present invention, includes expelling cooled and dehumidified air into the space defined within the enclosure screen 142. Another technical effect of these embodiments of the present invention includes ability to force cooled air about the molded articles being treated in the plurality of molded article receptacles 130. As a result of this, a larger differential between the temperature of the air forced around the molded articles being treated and the molded articles themselves is achieved, which in turn may lead to reduced post-mold cooling time. Another technical effect, attributable at least in part, to routing the cooled air through the post-mold treatment device 132 is a contact between the cooled air with a surface of the molded articles being treated for a comparatively prolonged period of time and, as such, ability to enjoy a comparatively higher differential between the temperature of the air forced around the molded articles being treated and the molded articles themselves for the comparatively prolonged period of time.

With reference to FIGS. 3A and 3B another non-limiting embodiment of the first linking arrangement 150 and the second linking arrangement 152 will now be described in greater detail. More specifically, FIGS. 3A and 3B depict a first linking arrangement 150' and the second linking arrangement 152', respectively, according to a non-limiting embodiment of the present invention. Within these embodiments of the present invention, the first linking arrangement 150 comprises an air blocking member 302. The air blocking member 302 comprises a first blocking portion 304 and a second blocking portion 306. The first blocking portion 304 can be made of a first material and the second blocking portion 306 can be made of a second material. For example, the first material can be a first porous material and the second material can be a second porous material, the second porous material being configured to permit less air to pass through than the first material. The air blocking member 302 can be swiveled 90 degrees about an axis depicted in FIG. 3A at "A" between the position shown in FIG. 3A (i.e. an air blocking position) to an air flowing position.

The second linking arrangement 152' comprises an unblocking member 308. The unblocking member 308 is substantially half-moon shaped member protruding beyond a distal end of the second linking structure 148. The unblocking member 308 is configured so that when the first linking structure 146 is moved towards the operating position, the unblocking member 308 engages the second blocking portion 306 and, effectively, swivels the air blocking member 302 into the air flowing position to permit free flow of the cooled air, as was substantially described above. On the other hand, when the first linking structure 146 is urged away from the first linking structure 146, the unblocking member 308 disengages the second blocking portion 306. Recalling that the second blocking member can be made of less porous material then the first blocking portion 304, under the pressure of blowing cooled air, the air blocking member 302 swivels back into the air blocking position. It should be noted, however, that in the air blocking position, some air still gets through the air blocking member 302, just not as much air as gets through when the air blocking member 302 is in the air flowing position. An additional technical effect of these embodiments of the present invention may include a lower level of noise, for example, when the air blocking member 302 is in the air blocking position.

It should be noted that non-limiting embodiments discussed above can have various alternative implementations. For the sake of an example, in an alternative non-limiting embodiment of the present invention, the linking structure for linking the dehumidifier 144 and the air management device 140 may comprise a single continuous tube. Within these embodiments of the present invention, a portion of the linking structure may comprise a flexible portion (such as, a stretchable portion, a collapsible portion, etc.) that can accommodate the stretch equal to the above-described second distance "P2", as well as other movements of the linking structure. Yet further alternative embodiments are also possible.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. An air management system for use with a molding system, comprising:
   an air management device operatively coupled to a post-mold treatment device of the molding system, the post-mold treatment device for treating a molded article positioned in a molded article receptacle of a robot of the molding system;
   an air source device configured to draw in ambient air and to cool the ambient air to a target temperature to output cooled air at the target temperature;
   a linking structure operatively coupling said air management device to said air source device;
   said post-mold treatment device comprising a plurality of treatment pins configured to direct, in use, cooled air at the target temperature from said air management device onto a portion of the molded article being treated;
   the air management system being configured to allow cooled air to be expelled around the molding system after the cooled air at the target temperature has been used to cool, at least partially, the portion of the molded article being treated, the target temperature being selected such that the so-expelled air has a dew point that is one of substantially equal to or below of a temperature associated with coolant media used for in-mold cooling;
   the air management device being implemented in a dehumidifier.

2. The air management system of claim 1, wherein said air source device is configured to cool the air to the target air temperature, the target air temperature being further selected so that to allow moisture in the air to condense for removal of moisture therefrom.

3. The air management system of claim 1, wherein said air source device comprises:
   an air inlet and an air compressor coupled to said air inlet;
   a refrigerating unit coupled to said air compressor, said air compressor configured to force air between said air inlet and said refrigerating unit for cooling the air;
   an air outlet coupled to said refrigerating unit and to said linking structure.

4. The air management system of claim 3, wherein said linking structure comprises a first linking structure operatively coupled to said air management device and a second linking structure operatively coupled to said air outlet.

5. The air management system of claim 4, wherein said first linking structure comprises a first linking arrangement and wherein said second linking structure comprises a second linking arrangement.

6. The air management system of claim 5, wherein said first linking structure and said second linking structure are actuatable between an open position where said first linking structure and said second linking structure are separated by a second distance and an operating position where said first linking arrangement operatively engages said second linking arrangement.

7. The air management system of claim 6, wherein the air source device is part of the molding system having an enclosure screen, and wherein in said open position, cooled air is expelled via the second linking structure into an area defined within the enclosure screen.

8. The air management system of claim 7, wherein second linking structure further comprises an auxiliary linking structure configure to direct a portion of the cooled air to a selected portion of the molding system.

9. The air management system of claim 5, wherein said first linking arrangement comprises a tubular pocket defined on an interior surface of said first linking structure and wherein said second linking arrangement is dimensioned in such a way that a portion thereof is received, in use, within said tubular pocket.

10. The air management system of claim 5, wherein said first linking arrangement comprises an air blocking member and wherein said second linking arrangement comprises an unblocking member; said unblocking member being configured to actuate said air blocking member between an air flowing position and an air blocking position.

11. The air management system of claim 10, said air blocking member comprises a first blocking portion made of a first material and a second blocking portion made of a second material; wherein said second material is configured to let less air through compared to said first material.

12. The air management system of claim 3, wherein said linking structure comprises a flexible portion configured to flex to a pre-determined distance.

* * * * *